United States Patent Office 3,490,918
Patented Jan. 20, 1970

3,490,918
SHORTENINGS CONTAINING ETHOXYLATED PARTIAL GLYCEROL ESTERS
Richard R. Egan, Edina, Minn., Sidney B. Lampson, Hinsdale, Ill., and Ira A. MacDonald, Prior Lake, Minn., assignors to Ashland Oil & Refining Company, Houston, Tex., a corporation of Kentucky
No Drawing. Continuation-in-part of application Ser. No. 488,747, Sept. 20, 1965. This application Oct. 11, 1968, Ser. No. 766,980
Int. Cl. A23d 5/00
U.S. Cl. 99—118     9 Claims

ABSTRACT OF THE DISCLOSURE

Plastic and liquid shortenings containing an ethoxylated partial glycerol ester of a higher fatty acid in an additive amount capable of enhancing the properties of foods prepared from said shortenings, especially bakery goods.

CROSS-REFERENCE TO A RELATED APPLICATION

This application is a continuation-in-part of copending application Ser. No. 488,747, filed Sept. 20, 1965, now U.S. Patent No. 3,433,645.

BACKGROUND OF THE INVENTION

Field of the invention

This invention relates to shortenings containing an additive amount of a non-fatty material.

Description of the prior art

Liquid and plastic shortenings are used in the preparation of many different foods. These shortenings are of animal and vegetable origin containing liquid and solid fats and oils. Although some plastic shortenings can be obtained directly from natural sources, e.g., lard, most plastic shortenings are prepared by the hydrogenation of unsaturated liquid oils, e.g., cottonseed oil.

At the present time, plastic shortenings are used in greater quantites than are liquid shortenings. This is so in spite of the disadvantages in handling plastic shortenings.

The foremost advantages associated with the use of plastic shortenings in, for example, cake making is the ability of plastic shortenings to entrap and hold considerable quantities of air during the mixing of batters and doughs. By contrast, liquid oils are reported to disperse in batters and doughs in the form of spherical droplets which have less surface area (per unit of volume) in contact with the other batter ingredients than do plastic shortenings which disperse in sheets and films.

As a consequence, many additives have been suggested for use with liquid shortenings in attempts to overcome these deficiencies thereby approaching the culinary performance of the plastic shortenings. Likewise, those engaged in the manufacture and sale of plastic shortenings have attempted to fortify or improve their plastic shortenings by the addition thereto of intentional food additives to thereby maintain their competitive advantage. The effectiveness of such additives can be measured by observing the changes which they cause to the foods into which the enriched shortenings are incorporated.

The use of intentional food additives in both liquid and plastic shortenings is an accepted commercial practice at the present time. However, these practices are not free from problems. For example, some food additives are not soluble in liquid shortenings, other additives are difficult to plastize into plastic shortenings, other combinations do not possess sufficient shelf stability, and still other combinations do not remain homogeneous at low and/or elevated temperatures.

SUMMARY OF THE INVENTION

We have discovered that improved shortening products are provided by incorporating into an edible, food-grade liquid or plastic shortening from about 0.1 to 15 weight percent of an ethoxylated partial glycerol ester of a $C_{10}$–$C_{24}$ fatty acid or mixture thereof.

The resulting improved shortenings can be used in the same manner as other shortenings known to the art in the following culinary practices:

(1) In baking, as in baking breads, cakes, biscuits, muffins, pancakes, waffles and cookies.
(2) In the preparation of icings, frostings, creme fillings and candies.
(3) In pan frying and braising.
(4) In deep frying, as in french frying potatoes, doughnuts, onion rings and potato chips.
(5) In the preparation of edible emulsions, as in the preparation of said salad dressings and oiled sauces.

The present invention is particularly applicable in the preparation of all-purpose liquid shortenings. The additives of this invention enhance the performance of liquid shortenings, particularly when used in breads and cakes, through their ability to impart improved dough conditioning properties. Furthermore, they are substantially more oil soluble than the additives hitherto proposed for this purpose, e.g., ethoxylated-20-sorbitan monostearate.

DESCRIPTION OF THE PREFERRED EMBODIMENTS

All of the various plastic and liquid shortenings are applicable in the practice of the present invention. Exemplary of such shortenings are: lard, hydrogenated vegetable oils, safflower oil, corn oil, superglycerinated oils, and the like including mixtures thereof.

The additives of this invention can be added to the liquid or plastic shortenings by mixing or otherwise blending to thereby incorporate an effective amount of the additive broadly ranging from 0.1 to 15%, and more preferably, from 0.2 to 12% based on the weight of the shortening.

As indicated above, the base materials for preparing the ethoxylated products useful in the practice of this invention are the partial glycerol esters of a higher fatty acid. In the art concerned, such partial esters are generally referred to as monoglyceride products although they are actually mixtures of monoglycerides and diglycerides together with very minor amounts of triglyceride and glycerine. These partial esters are also further characterized in terms of their monoglyceride content. All such monoglyceride products containing at least 10% total monoglyceride content are applicable in deriving the additives of this invention. The preferred monoglyceride products, however, are those containing from about 20–40 weight percent total monoglyceride content. The preferred products, hereinafter referred to as crude monoglycerides, can be readily prepared by the glycerolysis of a triglyceride, i.e., transesterifying in the presence of a basic catalyst, preferably an alkali metal hydroxide, a mixture of gylcerine and triglyceride. Alternatively, the crude glycerides can be obtained by directly esterifying a mixture of glycerine and the fatty acids.

Monoglyceride products containing a higher level of monoglyceride content than that realized in the aforementioned processes can advantageously be employed in preparing the additives contemplated herein. Products of the foregoing type are generally obtained by distilling a crude monoglyceride. In view of the marginally improved performance of the additives derived from refined monoglycerides having in excess of about 70% total monoglyceride content, the use of such highly refined products is not economically justified.

The fatty residue of the above-described monoglyceride products can be derived from a fatty acid, or mixture thereof, containing from 10–24 and more preferably, from 14–18 carbon atoms. Such fatty acids can be saturated or unsaturated but are preferably saturated. Hydrogenated tallow fatty acids represent the preferred fatty acids for preparing the additives of this invention.

The ethylene oxide, or more strictly speaking, polyoxyethylene content of the additives useful in the practice of this invention can vary widely, viz, from 10 to 95% on a weight basis. A more preferred content thereof is from 25 to 80% with the range of from about 45–75% representing the optimum in those instances where the additive is derived from the preferred monoglycerides as aforedescribed.

The condensation of the crude or refined monoglycerides with ethylene oxide can be effected under the reaction conditions heretofore used to prepare the condensation products of ethylene oxide with, for example, sorbitan monostearate. Thus, ethylene oxide and a crude or partially refined monoglyceride can be condensed by heating them together in the presence of a suitable condensation catalyst, e.g., potassium hydroxide, at temperatures of from 320°–350° F. at pressures of 20–150 p.s.i.g.

The present invention is further illustrated by the following specific examples. Unless otherwise indicated, all parts and percentages are by weight.

Example I

This example illustrates the preparation of a crude monoglyceride by the glycerolysis of a fatty triglyceride (step I) and the subsequent condensation of ethylene oxide with the crude monoglyceride (step II) to form an ethoxylated monoglyceride useful in the practice of the present invention.

*Step I (preparation of a crude monoglyceride).*—Ninety parts of a fatty triglyceride (hydrogenated tallow having an iodine value of less than 5) are placed in a reaction vessel and melted. Meanwhile, 0.3 part of potassium hydroxide (100% basis) are dissolved in 10 parts of glycerine. The resulting glycerine-KOH mixture is then poured into the reaction vessel and mixed with the melted triglyceride. The resulting reaction mixture is then heated with agitation to a reaction temperature of 320°–340° F. Agitation is continued and the reaction mixture is sparged with nitrogen. The reaction is continued for 8–10 hours at which time the contents of the reaction vessel are cooled and recovered. The recovered product is a crude monoglyceride containing approximately 25% alpha monoglycerides, 2.5% unreacted glycerine, with the balance being beta monoglycerides, diglycerides and triglycerides. This crude monoglyceride will typically have an acid number less than 1, a saponification number of approximately 170–175, an average molecular weight of 520–550, and be a clear, pale liquid at 140° F.

A hydrogenated fatty triglyceride which can be used in the foregoing reaction is an edible grade of hydrogenated tallow having an iodine value of less than 2, an acid value of less than 2, a saponification value of 190–200, a titer of 55–62° C., and an average molecular weight of 850–875. The fatty acid radicals present in such a hydrogenated tallow are typically 4% myristic acid (a $C_{14}$ acid), 31% palmitic acid (a $C_{16}$ acid) and 65% stearic acid (a $C_{18}$ acid).

*Step II (preparation of an ethoxylated monoglyceride).*—Five hundred thirty-five parts of the crude monoglyceride of step I are added to a suitable reaction vessel, heated to 320°–340° F. and held at that temperature. The monoglyceride is then agitated and the reaction vessel is thoroughly swept with dry nitrogen to remove all traces of water and oxygen. This step is repeated. The reaction vessel is then closed and nitrogen pressure is allowed to build up to 5 p.s.i.g. Next, the addition of 880 parts of ethylene oxide is begun. The reaction between the ethylene oxide and crude monoglyceride begins instantly. It is catalyzed by the potassium hydroxide from step I which was not removed from the crude monoglyceride. The pressure in the reaction vessel is allowed to rise to 40–60 p.s.i.g. and is maintained at this level throughout the remainder of the reaction. The pressure is controlled by manipulating the addition rate of ethylene oxide. The temperature range is controlled at 340°–380° F. by cooling coil which is used intermittently as needed. When all of the ethylene oxide is added and reacted, the pressure will drop rapidly. Total reaction time for ethoxylation is 8–10 hours. The reaction mixture is then cooled until the pressure in the reaction vessel has been reduced to 5 p.s.i.g. The reaction vessel is then vented to the atmosphere and opened. The residual potassium hydroxide is neutralized with 3.3 parts of 85% aqueous phosphoric acid. 2.3 parts of activated charcoal are then added to the reaction mixture with agitation. The reaction product is then filtered to remove the activated charcoal. The filtrate is an ethoxylated monoglyceride (a 20 mole adduct) having an ethylene oxide content of from about 60–68% as reported on an anhydrous basis. Ordinarily, the hydroxyl value will be between 65–80 and the saponification value will be 65–75. Usually, the acid value will be less than 2.

The standard test method found in JAOAC 47, 685–688 (1964) satisfactorily identifies the qualitative and quantitative presence of ethoxylated monoglycerides in baked goods such as bread at levels as low as 0.1% by weight based on the weight of flour in the product. Other tests (e.g. for acid value) can be determined by using the tests described in Food Chemical Codex, first edition, 1966.

*Toxicological effects.*—Tests have been carried out to determine the safety of ethoxylated monoglycerides using an ethoxylated 25% alpha monoglyceride (20 moles of ethylene oxide per mole of crude monoglyceride) substantially identical to the ethoxylated monoglyceride produced in step II of this example.

The estimated oral $LD_{50}$ has been determined to be in excess of 20 grams per kilogram of body weight. Adult albino male rats were used for this work. These rats were fed water and standard laboratory rations ad libitum. The rats were given single calculated doses of the ethoxylated monoglyceride via stomach syringe and observed for a two week period. The dose rates varied up to as much as 20 grams per kilogram of body weight. None of the rats dosed at 20 grams per kilogram of body weight died.

A 90 day feeding study was conducted on dogs fed standard rations supplemented with this same ethoxylated monoglyceride at levels of zero, 0.2, 1.0 and 5.0% of the total diet. Body weight, food consumption, urinalysis, hematologic, organ weight, and histologic data were examined and revealed no effects which were related to the administration of the ethoxylated monoglyceride. Electrocardiographic examination and a balance study on the intake and excretion of ethoxylated monoglyceride indicate that it is not metabolized and that it is excreted unchanged in the feces.

Example II

This example illustrates the incorporation of an ethoxylated monoglyceride into a plastic shortening.

First, an ethoxylated monoglyceride corresponding to that of Example I is prepared. Then 100 parts of a plastic unemulsified vegetable shortening (hereinafter described) are heated to 140°–150° F. and 6 parts of the ethoxylated monoglyceride are dispersed into the heated shortening with agitation. The resulting blend is then processed through an ammonia jacketed plasticizer unit and an agitated worker unit operating at 250 p.s.i.g. and 82°–86° F. Twelve (12) percent nitrogen is injected into the product. The final product is then cooled to a temperature of 70°–76° F.

The unemulsified shortening is an all vegetable shortening (Hunt-Wesson MFB) having a Wiley melting point of 113°–117° F. and a solid-fat index of 18–22 at 70° F. and 7–10 at 104° F.

Examples III–VI

These examples further illustrate the preparation of improved plastic shortenings containing the food additives of the present invention. The procedure of Example II is used in Examples III–VI. In each case, 0.05 part of a commercial antioxidant is plasticized into the shortening together with the ethoxylated monoglyceride.

In Example III a blend of additives was used. The blend was a 50/50 mixture of ethoxylated monoglyceride (equal to the product of Example I) and a commercial monoglyceride (Starfol GMS–400; a mono, di-glyceride mixture containing about 40–45% alpha monoglyceride).

In Example IV, a blend of additives was used. The blend was a 35/65 mixture of ethoxylated monoglyceride (equal to the product of Example I) and a commercially available monoglyceride (the same as used in Example III).

In Example V, a blend of additives was again used. This blend was a 25/75 mixture of ethoxylated monoglyceride (equal to the product of Example I) and a commercially available monoglyceride (the same as used in Example III).

In Example VI, a blend of additives was again used. The blend was a 10/90 mixture of ethoxylated monoglyceride (equal to the product of Example I) and a commercially available monoglyceride (the same as used in Example III).

The resulting additive-containing plastic shortenings of Examples III–VI are of good quality and are suitable for use as ready-made enriched shortenings.

Example VII

This example illustrates the preparation of a liquid shortening containing an ethoxylated monoglyceride of the present invention.

Ten (10) parts of an ethoxylated monoglyceride (the same as the product of Example I) are blended with 100 parts of an edible soybean oil after first heating the soybean oil to 120° F. The resulting product (an enriched liquid shortening) is storage stable.

The extent of the storage stability of these products is reflected by test results showing that soybean oil containing as much as 50% of this ethoxylated monoglyceride remained stable over a storage period of six (6) weeks at normal room temperature. Such results compare very favorably with the poor storage stability of oil dispersions of other ethoxylated food additives. For example, a blend of 10% of the 20 mole ethylene oxide adduct of sorbitan monostearate in soybean oil is unstable and the ethoxylate comes out as an unctuous precipitate or glob after storage at room temperature for only one day.

Example VIII

This example illustrates the use of the improved shortenings of the present invention in the making of bread.

Bread is made in continuous bread making equipment from a dough formulation consisting of 100 parts of flour, 67 parts of water, 3.25 parts enriched lard plus flake, 2.5 parts yeast, 2 parts salt, 8 parts of sugar, 2 parts of non-fat dry milk solids, 0.75 part yeast food, 6 p.p.m. potassium bromate, 15 p.p.m. potassium iodate, and 0.1 part calcium acid phosphate. The mixing head speed is 195 r.p.m. and the dough pan temperature is 105° F. Fermentation time is 2.5 hours.

The enriched lard used in this example consists of 3 parts of lard plus flake and 0.25 part of ethoxylated monoglyceride corresponding to the product of Example I. Thus, the level of ethoxylated monoglyceride in this improved shortening was approximately 8.3% based on the weight of the shortening base and 0.25% based on the weight of the flour used to make the bread.

For purposes of control, bread is made by the same procedure and from the same ingredients with the only difference being the omission of the ethoxylated monoglyceride.

The bread conitaning the ethoxylated monoglyceride is of a very good quality, and when rated according to standard scoring methods for bread, will be superior to the control bread in terms of volume, grain and texture.

The ethoxylated monoglyceride is shown to be an effective dough conditioning agent in yeast raised baked goods by helping to produce bread having a more desirable appearance, crumb, compression, and resistance to adverse dough handling conditions.

Example IX

This example illustrates the use of the improved shortenings of the present invention in the preparation of cakes.

A high ratio white cake is prepared from the following ingredients in the proportions indicated.

| Ingredients: | Parts |
| --- | --- |
| Cake flour | 100 |
| Sugar | 120 |
| Salt | 3 |
| Non fat milk solids | 11.25 |
| Baking powder | 6.25 |
| Shortening | 50 |
| Water | 125 |
| Dried egg whites | 7.85 |

The single stage mixing method is used. The scaling weight is 14 oz. in an 8 inch cake pan and the bake is at 375° F. for 24 minutes.

In this example, the improved shortening of Example III is used, i.e., shortening containing 6% of a 50/50 mixture of ethoxylated monoglyceride and monoglyceride. For purposes of comparison, the procedure is repeated using a commercially available emulsified shortening. This commercially available emulsified shortening is an all vegetable shortening having a plastic range of 70°–80° F. and a Wiley melting point of 113°–117° F. This commercially available shortening contains approximately 8% of a monoglyceride of commerce (approximately 40–45% alpha monoglyceride) having a melting point of approximately 120° F.

The cake batter made with the shortening of the present invention has a specific gravity of 0.725. In sharp contrast, the cake batter made with the commercial emulsified shortening has a specific gravity of 0.950. The substantial increase in lightness, i.e., reduced density, of the cake which is obtained by the practice of the present invention is indicated by these specific gravities.

Example X

This example illustrates the use of the improved shortenings of the present invention in the preparation of creme fillings.

In this example, 10% water creme fillings are prepared from the following ingredients:

| Creme Filling Formulation: | Parts |
| --- | --- |
| Sugar (10X) | 65 |
| Shortening | 24.6 |
| Salt | 0.3 |
| Water | 10.0 |
| Flavoring (optional) | 0.1 |
| | 100.0 |

The improved shortening used in this example was an all vegetable plastic shortening and contained 6% of the additive blend of Example III.

For purposes of comparison, the procedure is repeated using the same shortening, but without the additive blend.

The creme filling prepared with the improved shortening of the present invention is white and fluffy and has a density of 0.52 gram/cc. In contrast, the creme filling prepared for purposes of comparison has a density of 0.77 gram/cc. and is curdled.

In this connection, product densities of 0.60 gram/cc. and below compare favorably with commercial creme fillings. Product densities significantly above 0.60 gram/cc., e.g., 0.75 gram/cc., are generally considered to be of low quality.

Examples XI and XII

When the improved shortenings of the present invention are used to prepare frostings and coffee whiteners, the resulting products are superior to frostings and coffee whiteners prepared with the same shortenings, but without the food additives disclosed herein.

Frostings prepared according to this invention exhibit reduced densities and improved spreadability when compared to frostings prepared with non-emulsified shortenings and with some commercial emulsified shortenings.

Coffee whiteners prepared with the improved shortenings of the present invention are color stable and equal to commercially available coffee whiteners in their whitening power.

From the foregoing description and examples, it can be appreciated that useful enriched shortenings can be obtained from the practice of this invention. If desired, the intentional food additives of this invention can be used singly, as mixtures with each other, or as mixtures with other food additives. Particularly useful combinations of additives can be obtained by mixing the additives of this invention with the common monoglycerides of commerce.

What is claimed is:

1. A liquid or plastic shortening product containing from 0.1–15% by weight based on the shortening content thereof of an additive comprising the condensation product of from 10–95 parts by weight ethylene oxide and correspondingly from 90–5 parts by weight of a partial glycerol ester of a $C_{10}$–$C_{24}$ fatty acid containing at least 10 weight percent monoglyceride content with diglycerides, triglycerides and glycerine constituting the balance.

2. A shortening product in accordance with claim 1 wherein the amount of said additive is from about 0.2 to 12 percent.

3. A shortening product in accordance with claim 2 wherein said additive is a condensation product of from about 25–80 parts by weight ethylene oxide and correspondingly from 75 to 20 parts of said partial glycerol ester having a monoglyceride content of from 10–70 weight percent.

4. A shortening product in accordance with claim 3 wherein said additive is a condensation product of from about 45–75 parts by weight ethylene oxide and correspondingly from 55–25 parts of said partial glycerol ester having a monoglyceride content of from about 20–40 weight percent.

5. A shortening product in accordance with claim 4 wherein said fatty acid is a $C_{14}$–$C_{18}$ saturated fatty acid.

6. A shortening product in accordance with claim 5 wherein said partial glycerol ester is a glycerolysis product of hydrogenated tallow.

7. A shortening product in accordance with claim 6 wherein said glycerolysis product contains about 30 weight percent monoglyceride content.

8. A shortening product in accordance with any one of claims 1, 2, 3, 4, 5, 6 and 7 wherein the shortening is lard.

9. A shortening product in accordance with any one of claims 1, 2, 3, 4, 5, 6 and 7 wherein the shortening is a vegetable oil.

References Cited

UNITED STATES PATENTS

| 1,970,578 | 8/1934 | Schoeller et al. | 260—410.6 X |
| 2,973,270 | 2/1961 | Thompson et al. | 99—123 |

MAURICE W. GREENSTEIN, Primary Examiner

U.S. Cl. X.R.

99—123, 139, 144